US012570824B2

(12) United States Patent
Takagi

(10) Patent No.: US 12,570,824 B2
(45) Date of Patent: Mar. 10, 2026

(54) OLEFIN-BASED THERMOPLASTIC ELASTOMER FOAMED PARTICLE AND OLEFIN-BASED THERMOPLASTIC ELASTOMER FOAMED PARTICLE MOLDED BODY

(71) Applicant: JSP Corporation, Tokyo (JP)

(72) Inventor: Shota Takagi, Fuji (JP)

(73) Assignee: JSP Corporation, Tokyo (JP)

( * ) Notice: Subject to any disclaimer, the term of this patent is extended or adjusted under 35 U.S.C. 154(b) by 748 days.

(21) Appl. No.: 17/909,919

(22) PCT Filed: Feb. 1, 2021

(86) PCT No.: PCT/JP2021/003486
§ 371 (c)(1),
(2) Date: Sep. 7, 2022

(87) PCT Pub. No.: WO2021/181939
PCT Pub. Date: Sep. 16, 2021

(65) Prior Publication Data
US 2023/0107047 A1 Apr. 6, 2023

(30) Foreign Application Priority Data
Mar. 10, 2020 (JP) ................................. 2020-041024

(51) Int. Cl.
*C08J 9/16* (2006.01)
*C08L 23/06* (2006.01)
(52) U.S. Cl.
CPC .................. *C08J 9/16* (2013.01); *C08L 23/06* (2013.01); *C08J 2323/06* (2013.01); *C08J 2453/00* (2013.01); *C08L 2207/04* (2013.01); *C08L 2207/062* (2013.01)

(58) Field of Classification Search
CPC ...... C08J 9/16; C08J 2323/06; C08J 2453/00; C08J 2201/026; C08J 2203/06; C08J 9/122; C08J 9/18; C08J 2201/03; C08J 9/0061; C08J 9/232; C08J 2353/00; C08J 2423/06; C08L 23/06; C08L 2207/04; C08L 2207/062; B29C 44/3461; B29C 44/44; B29K 2023/06
See application file for complete search history.

(56) References Cited

FOREIGN PATENT DOCUMENTS

| JP | 2018-058961 A | | 4/2018 |
| JP | 2018070735 A | * | 5/2018 |
| JP | 2019-014770 A | | 1/2019 |
| JP | 2019-048942 A | | 3/2019 |
| JP | 2020-070387 A | | 5/2020 |
| JP | 2020-084148 A | | 6/2020 |
| WO | 2016/052112 A1 | | 4/2016 |
| WO | 2018/212183 A1 | | 11/2018 |
| WO | 2020/090335 A1 | | 5/2020 |

OTHER PUBLICATIONS

Translation of Table 1 from JP 2018-070735 (Year: 2018).*
International Search Report for PCT/JP2021/003486, mailed Mar. 30, 2021, and English Translation submitted herewith (7 pages).

* cited by examiner

*Primary Examiner* — K. Boyle
(74) *Attorney, Agent, or Firm* — Fitch, Even, Tabin & Flannery LLP

(57) ABSTRACT

A thermoplastic olefinic elastomer expanded bead, which is an expanded bead including a thermoplastic olefinic elastomer as a main component, wherein the expanded bead has an average particle diameter of 0.5 to 5 mm, the expanded bead has a heat of fusion of 60 to 80 J/g, and a difference [Tm–Tc] between a melting point (Tm) and a crystallization temperature (Tc) of the expanded bead is 20° C. or lower.

11 Claims, No Drawings

OLEFIN-BASED THERMOPLASTIC ELASTOMER FOAMED PARTICLE AND OLEFIN-BASED THERMOPLASTIC ELASTOMER FOAMED PARTICLE MOLDED BODY

CROSS-REFERENCE TO RELATED APPLICATIONS

This application is a U.S. national phase application filed under 35 U.S.C. § 371 of International Application Number PCT/JP2021/003486, filed Feb. 1, 2021, designating the United States, which claims priority from Japanese Application Number 2020-041024, filed Mar. 10, 2020.

FIELD OF THE INVENTION

The present invention relates to an expanded bead having a thermoplastic olefinic elastomer as a base polymer.

BACKGROUND OF THE INVENTION

Thermoplastic olefinic elastomers have excellent flexibility, impact resilience, and the like, and are therefore used in various applications such as cushioning materials, vibration-proof materials, sporting goods, and automobile parts.

An expanded beads molded article of a thermoplastic olefinic elastomer can be lighter in weight while maintaining the excellent properties, such as flexibility and impact resilience, owing to the thermoplastic olefinic elastomer, and therefore further development for applications in fields such as sporting goods, automobile parts, and building materials can be expected.

Recently, some applications have required, for example, an expanded beads molded article of a thermoplastic olefinic elastomer having a thick portion and a thin portion and having a complicated shape. For example, Patent Literature 1 discloses an expanded beads molded article having excellent surface properties and fusion bondability as well as excellent durability, even when there are thick and thin portions, as a result of making a crosslinked expanded bead of a multi-block copolymer of a polyethylene block and an ethylene/α-olefin copolymer block into small particles.

CITATION LIST

Patent Literature

PTL1: JP 2018-58961 A

SUMMARY OF INVENTION

Recently, due to the diversification of applications of expanded beads molded articles of thermoplastic olefinic elastomers, the realization of a thermoplastic olefinic elastomer expanded bead having good moldability even when formed in a mold that can obtain a molded article having a large thickness difference and a more complicated shape has been desired.

The present invention has been made in view of the existence of the above-mentioned problem, and an object thereof is to provide a thermoplastic olefinic elastomer expanded bead having good moldability even when formed in a mold that can obtain a molded article having a large thickness difference and a more complicated shape.

As a result of diligent research, the present inventor found that the above-described problem can be solved by employing the following configurations, and thereby completed the present invention.

That is, the present invention is as follows.

[1] A thermoplastic olefinic elastomer expanded bead, which is an expanded bead comprising a thermoplastic olefinic elastomer as a main component, wherein the expanded bead has an average particle diameter of 0.5 to 5 mm, the expanded bead has a heat of fusion of 60 to 80 J/g, and a difference [Tm−Tc] between a melting point (Tm) and a crystallization temperature (Tc) of the expanded bead is 20° C. or lower.

[2] The thermoplastic olefinic elastomer expanded bead according to [1], wherein the expanded bead has a crystallization temperature (Tc) of 105 to 120° C.

[3] The thermoplastic olefinic elastomer expanded bead according to [1] or [2], wherein the thermoplastic olefinic elastomer is a block copolymer of a hard segment composed of a polyethylene block and a soft segment composed of an ethylene/α-olefin copolymer block.

[4] The thermoplastic olefinic elastomer expanded bead according to any of [1] to [3], wherein the expanded bead has a base polymer composed of a mixture of a thermoplastic olefinic elastomer and a polyethylene-based resin, and a content of the polyethylene-based resin in the base polymer is 3 to 25% by mass.

[5] The thermoplastic olefinic elastomer expanded bead according to [4], wherein the polyethylene-based resin is high-density polyethylene.

[6] The thermoplastic olefinic elastomer expanded bead according to any of [1] to [5], wherein the expanded bead has an average particle diameter (D) of 1 to 4 mm and the expanded bead has an average mass (W) of 1 to 4 mg.

[7] The thermoplastic olefinic elastomer expanded bead according to any of [1] to [6], wherein a product [(D)×(W)] of the average particle diameter (D) and the average mass (W) of the expanded bead is 15 or less.

[8] The thermoplastic olefinic elastomer expanded bead according to any one of [1] to [5], wherein the expanded bead has an average particle diameter (D) of 1 to 4 mm, the expanded bead has an average mass (W) of 1 to 4 mg, and a product [(D)×(W)] of the average particle diameter (D) and the average mass (W) of the expanded bead is 15 or less.

[9] The thermoplastic olefinic elastomer expanded bead according to any one of [1] to [8], wherein the expanded bead has a xylene insoluble content obtained by thermal xylene extraction of 30 to 70% by mass.

[10] The thermoplastic olefinic elastomer expanded bead according to any one of [1] to [9], wherein the expanded bead has an apparent density of 30 to 150 kg/m³.

[11] A thermoplastic olefinic elastomer expanded beads molded article, which is an expanded beads molded article constituted from an expanded bead comprising a thermoplastic olefinic elastomer as a main component, wherein the expanded bead has a heat of fusion of 60 to 80 J/g, a difference [Tm−Tc] between a melting point (Tm) and a crystallization temperature (Tc) of the expanded bead is 20° C. or lower, and the number of expanded beads per unit area on a surface of the expanded beads molded article is 3 to 30 particles/cm².

[12] The thermoplastic olefinic elastomer expanded beads molded article according to [11], wherein the expanded beads molded article satisfies the following relationship (Expression 1):

$$15 \leq A \times B \qquad \text{(Expression 1)}$$

wherein A represents a tensile strength (MPa) of the expanded beads molded article, and B represents a tensile elongation (%) of the expanded beads molded article.

[13] A thermoplastic olefinic elastomer expanded beads molded article, which is an expanded beads molded article constituted from an expanded bead comprising a thermoplastic olefinic elastomer as a main component, wherein the expanded bead has a heat of fusion of 60 to 80 J/g, a difference [Tm−Tc] between a melting point (Tm) and a crystallization temperature (Tc) of the expanded bead is 20° C. or lower, the number of expanded beads per unit area on a surface of the expanded beads molded article is 6.5 to 30 particles/cm², and the expanded beads molded article satisfies the following relationship (Expression 2):

$$45 \leq A \times B \leq 135 \qquad \text{(Expression 2)}$$

wherein A represents a tensile strength (MPa) of the expanded beads molded article, and B represents a tensile elongation (%) of the expanded beads molded article.

According to the present invention, a thermoplastic olefinic elastomer expanded bead having good moldability even when formed in a mold that can obtain a molded article having a large thickness difference and a more complicated shape can be provided.

DESCRIPTION OF EMBODIMENTS

<Expanded Bead>

The thermoplastic olefinic elastomer expanded bead of the present invention (hereinafter, also simply referred to as "expanded bead") is an expanded bead having a thermoplastic olefinic elastomer as a base polymer. The expanded bead has an average particle diameter of 0.5 to 5 mm and a heat of fusion of 60 to 80 J/g. A difference [Tm−Tc] between a melting point (Tm) of the expanded bead and a crystallization temperature (Tc) of the expanded bead measured by heat flux differential scanning calorimetry (DSC) by heating the expanded bead from 30° C. to 200° C. at a heating rate of 10° C./min and then cooling from 200° C. to 30° C. at a cooling rate of 10° C./min is 20° C. or lower.

In the present specification, "A to B" representing a numerical range is synonymous with "A or more and B or less", and represents a numerical range including A and B, which are the end points of the numerical range.

[Base Polymer]

The expanded bead of the present invention includes a thermoplastic olefinic elastomer (TPO) as a main component. In the present specification, "includes TPO as a main component" means that 50% by mass or more of the expanded bead is a thermoplastic olefinic elastomer, preferably 60% by mass or more, and more preferably 70% by mass or more. The expanded bead of the present invention preferably has a base polymer composed of a mixture of a thermoplastic olefinic elastomer and a polyethylene-based resin.

(Thermoplastic Olefinic Elastomer (TPO))

Examples of the TPO include a mixture constituted of a hard segment composed of a propylene resin and a soft segment composed of an ethylene rubber, a block copolymer of a hard segment composed of a polyethylene block and a soft segment composed of an ethylene/α-olefin copolymer block, and the like. Among these, the thermoplastic olefinic elastomer is preferably a block copolymer of a hard segment composed of a polyethylene block and a soft segment composed of an ethylene/α-olefin copolymer block. If the TPO has a polyethylene block as a hard segment, when the base polymer contains a polyethylene-based resin, compatibility with the polyethylene-based resin is high, so that the excellent properties of the TPO can be suitably maintained.

In the mixture constituted of a hard segment composed of a propylene resin and a soft segment composed of an ethylene rubber, examples of the propylene resin include a propylene homopolymer, a copolymer of propylene and ethylene or an α-olefin having 4 to 8 carbon atoms, and the like. Moreover, examples of the ethylene rubber include a copolymer of ethylene and an α-olefin having 3 to 8 carbon atoms, a copolymer of ethylene and a non-conjugated diene such as 5-vinyl-2-norbornene, 5-ethylidene-2-norbornene, 5-methylene-2-norbornene, dicyclopentadiene, and the like.

In the block copolymer of a hard segment composed of a polyethylene block and a soft segment composed of an ethylene/α-olefin copolymer block, examples of the polyethylene block include an ethylene homopolymer and a copolymer of ethylene and an α-olefin having 3 to 8 carbon atoms. Moreover, examples of the ethylene/α-olefin copolymer block include a block of a copolymer of ethylene and an α-olefin having 3 to 20 carbon atoms. Examples of the α-olefin copolymerizing with ethylene include propylene, 1-butene, 1-pentene, 1-hexene, 1-heptene, 1-octene, 1-nonene, 1-decene, 3-methyl-1-butene, 4-methyl pentene, and the like. Among these, from the viewpoint of industrial availability, various properties, economic efficiency, and the like, the α-olefin copolymerizing with ethylene is preferably propylene, 1-butene, 1-hexene, or 1-octene, and particularly preferably 1-octene.

The proportion of the ethylene unit in the polyethylene block is, based on the mass of the polyethylene block, preferably 95% by mass or more, and more preferably 98% by mass or more. On the other hand, the proportion of the α-olefin unit in the ethylene/α-olefin copolymer block is, based on the mass of the ethylene/α-olefin copolymer block, preferably 5% by mass or more, more preferably 10% by mass or more, and further preferably 15% by mass or more. The proportion of the polyethylene block and the proportion of the ethylene/α-olefin copolymer block are calculated based on data obtained from differential scanning calorimetry (DSC) or nuclear magnetic resonance (NMR).

<<Heat of Fusion of TPO>>

The heat of fusion of the TPO is preferably 20 to 80 J/g, and more preferably 30 to 70 J/g. When the heat of fusion of the TPO is within the above range, the expanded beads molded article obtained by molding the expanded bead of the present invention (hereinafter, this expanded beads molded article is also simply referred to as "expanded beads molded article" or "molded article ") has better heat resistance, and it is easier to adjust the heat of fusion of the expanded bead to a specific range.

The heat of fusion of the TPO is measured using a heat flux differential scanning calorimeter based on JIS K 7122: 1987. When a plurality of melting peaks appear in the DSC curve, the total area of the plurality of melting peaks is taken as the heat of fusion.

<<Melting Point of TPO>>

The melting point of the TPO is preferably 110 to 140° C., and more preferably 115 to 135° C. When the melting point of the TPO is in the above range, the heat resistance of the expanded beads molded article is improved, and the difference between the melting point and crystallization temperature of the expanded bead can be easily adjusted to a specific range.

The melting point of the TPO means the melting peak temperature measured based on the heat flux differential scanning calorimetry described in JIS K7121: 1987. As the adjustment of the state of the test piece, "(2) When the melting temperature is measured after performing a certain heat treatment" is adopted, and the heating rate and the cooling rate are both set to 10° C./min. When a plurality of melting peaks appear in the DSC curve, the peak temperature of the melting peak having the largest area is taken as the melting point.

<<Crystallization Temperature of TPO>>

The crystallization temperature of the TPO is preferably 80 to 120° C., and more preferably 85 to 115° C. When the crystallization temperature of the TPO is in the above range, the expanded bead has better moldability in the mold, and the difference between the melting point and the crystallization temperature of the expanded bead can be easily adjusted to a specific range.

The crystallization temperature of the TPO is measured using a heat flux differential scanning calorimeter based on JIS K7121: 1987. When a plurality of crystallization peaks appear in the DSC curve, the peak temperature of the crystallization peak having the highest peak height is taken as the crystallization temperature.

<<Density of TPO>>

The density of the TPO is, from the viewpoint of the flexibility owing to the TPO and the like, preferably 700 to 1000 kg/m³, and more preferably 800 to 900 kg/m³.

The density of the TPO is measured according to ASTM D792-13.

<<Flexural Modulus of TPO>>

The flexural modulus of the TPO is, from the viewpoint of flexibility owing to the expanded bead and the like, preferably 10 to 50 MPa, more preferably 15 to 40 MPa, and further preferably 20 to 35 MPa.

The flexural modulus of the TPO is measured according to JIS K 7171: 2016.

<<Melt Flow Rate (MFR) of TPO>>

The melt flow rate (MFR) of the TPO is preferably 2 to 10 g/10 min, more preferably 3 to 8 g/10 min, and further preferably 4 to 7 g/10 min. When the MFR of the TPO is in the above range, it is easy to obtain an expanded beads molded article having the desired physical properties.

The MFR of the TPO is measured at a temperature of 190° C. and a load of 2.16 kg according to JIS K 7210-1: 2014.

Commercially available products may be used as the TPO. Examples include the product "Infuse" manufactured by the Dow Chemical Company, the product "Affinity" manufactured by the Dow Chemical Company, and the product "Thermorun" manufactured by Mitsubishi Chemical Corporation, the product "Milastomer" manufactured by Mitsui Chemicals, Inc., the product "Tafmer" manufactured by Mitsui Chemicals, Inc., the product "Sumitomo TPE" manufactured by Sumitomo Chemical Co., Ltd., the product "Prime TPO" manufactured by Prime Polymer Co., Ltd., and the like.

The expanded bead of the present invention preferably has a base polymer composed of a mixture of a thermoplastic olefinic elastomer and a polyethylene-based resin. When the base polymer is a mixture of a thermoplastic olefinic elastomer and a polyethylene-based resin, it is easy to adjust the heat of fusion of the expanded bead to the above-mentioned specific range, and it is easy to adjust the difference between the melting point and crystallization temperature of the expanded bead to the above-mentioned specific range.

(Polyethylene-Based Resin)

In the present invention, "polyethylene-based resin" refers to a homopolymer of an ethylenic monomer or an ethylenic copolymer including 50% by mass or more of a structural unit derived from ethylene.

Examples of the polyethylene-based resin include ethylenic hydrocarbon homopolymers of ultra-low density polyethylene (VLDPE), low density polyethylene (LDPE), linear low density polyethylene (LLDPE), medium density polyethylene (MDPE), high density polyethylene (HDPE), and the like. Among these, the polyethylene-based resin is preferably a high-density polyethylene or a linear low-density polyethylene, and more preferably a high-density polyethylene. When the polyethylene-based resin is a type as described above, it is easier to adjust the heat of fusion of the expanded bead and the difference between the melting point and crystallization temperature of the expanded bead to specific ranges, and as a result, it is easier to obtain a molded article that has a complicated shape. These polyethylene-based resins may be used alone or in combination of two or more.

When a block copolymer of a hard segment composed of a polyethylene block and a soft segment composed of an ethylene/α-olefin copolymer block is used as the TPO, if the base polymer contains polyethylene-based resin, the compatibility between the TPO and the polyethylene-based resin is better. As a result, it is easier to reduce the strain of a bubble membrane during in-mold molding, the obtained expanded beads molded article has even better heat resistance, and the excellent properties of the TPO can be suitably maintained.

<<Heat of Fusion of Polyethylene-Based Resin>>

The heat of fusion of the polyethylene-based resin is preferably 50 to 200 J/g, more preferably 60 to 190 J/g, and further preferably 70 to 180 J/g. When the heat of fusion of the polyethylene-based resin is in the above range, the expanded beads molded article has better heat resistance, and it is easy to adjust the heat of fusion of the expanded bead to a specific range.

The heat of fusion of the polyethylene-based resin is measured by the same method as that described above for the heat of fusion of the TPO.

<<Melting Point of Polyethylene-Based Resin>>

The melting point of the polyethylene-based resin is preferably 110 to 145° C., more preferably 115 to 140° C., and further preferably 120 to 135° C. When the melting point of the polyethylene-based resin is in the above range, the expanded beads molded article has better heat resistance, and it is easy to adjust the difference between the melting point and crystallization temperature of the expanded bead to a specific range.

The melting point of the polyethylene-based resin is measured by the same method as that described above for the melting point of the TPO.

<<Crystallization Temperature of Polyethylene-Based Resin>>

The crystallization temperature of the polyethylene-based resin is preferably 90 to 130° C., and more preferably 100 to 125° C. When the crystallization temperature of the polyethylene-based resin is in the above range, the shrinkage rate of the expanded beads molded article can be reduced, and the difference between the melting point and crystallization temperature of the expanded bead can be easily adjusted to a specific range.

The crystallization temperature of the polyethylene-based resin is measured by the same method as that described above for the crystallization temperature of the TPO.

<<Density of Polyethylene-Based Resin>>

The density of the polyethylene-based resin is, from the viewpoint of heat resistance and the like, preferably 910 to 1000 kg/m$^3$, more preferably 920 to 980 kg/m$^3$, and further preferably 930 to 960 kg/m$^3$.

The density of the polyethylene-based resin is measured by the same method as that described above for the density of TPO.

<<Flexural Modulus of Polyethylene-Based Resin>>

The flexural modulus of the polyethylene-based resin is preferably 100 to 1000 MPa, more preferably 300 to 950 MPa, further preferably 400 to 900 MPa, and even further preferably 450 to 900 MPa. When the flexural modulus of the polyethylene-based resin is in the above range, heat resistance is improved while maintaining the excellent properties of the TPO.

The flexural modulus of the polyethylene-based resin is measured by the same method as that described above for the flexural modulus of the TPO.

<<Melt Flow Rate (MFR) of Polyethylene-Based Resin>>

The melt flow rate (MFR) of the polyethylene-based resin is preferably 2 to 50 g/10 min, more preferably 5 to 40 g/10 min, and further preferably 8 to 35 g/10 min. When the MFR of the polyethylene-based resin is within the above range, the expanded bead has better foamability, moldability and the like.

The MFR of the polyethylene-based resin is measured by the same method as that described for the MFR of the TPO.

(Mixture of Thermoplastic Olefinic Elastomer and Polyethylene-Based Resin)

When the base polymer is a mixture of a thermoplastic olefinic elastomer and a polyethylene-based resin, the content of the polyethylene-based resin in the base polymer is preferably 2 to 28% by mass, more preferably 3 to 25% by mass, and further preferably 4 to 23% by mass.

When the content of the polyethylene-based resin in the base polymer is in the above range, it is easier to adjust the heat of fusion of the expanded bead and the difference between the melting point and the crystallization temperature of the expanded bead to specific ranges while maintaining the excellent properties of the TPO.

Further, when the base polymer is a mixture of a thermoplastic olefinic elastomer and a polyethylene-based resin, a difference [(II)–(I)] between a melt flow rate (II) of the polyethylene-based resin and a melt flow rate (I) of the thermoplastic olefinic elastomer is preferably 1 to 25 g/10 min. By including the polyethylene-based resin such that this difference [(II)–(I)] in melt flow rates is in the range of 1 to 25 g/10 min, the expanded bead has better foamability and moldability. From this viewpoint, the difference [(II)–(I)] in melt flow rates is more preferably 2 to 23 g/10 min, further preferably 3 to 20 g/10 min, and particularly preferably 5 to 18 g/10 min.

(Other Polymers)

The base polymer may include polymers other than the TPO and the polyethylene-based resin as long as the intended effect of the present invention is not impaired. Examples of other polymers include thermoplastic resins such as polypropylene resins, polybutene resins, and polystyrene resins, and thermoplastic elastomers other than olefin polymers (for example, polybutadiene elastomers;

block copolymers of styrene-butadiene, styrene-isoprene, styrene-butadiene-styrene, styrene-isoprene-styrene, and their hydroxides), and the like.

The content of the other polymers in the base polymer is, based on 100 parts by mass of the base polymer, preferably 10 parts by mass or less, more preferably 5 parts by mass or less, and further preferably 0 parts by mass.

(Other additives)

Other additives may be added to the expanded bead of the present invention as long as the intended effect of the present invention is not impaired. Examples of other additives include an antioxidant, a UV-ray protective agent, an anti-static agent, a flame retardant, a flame retardant aid, a metal deactivator, a conductive filler, a cell controlling agent, and the like. Examples of the cell controlling agent include inorganic powders such as zinc borate, talc, calcium carbonate, boric acid, aluminum hydroxide, silica, zeolite, and carbon; and organic powders such as a phosphate nucleating agent, a phenol nucleating agent, an amine nucleating agent, and a polyfluoroethylene resin powder.

The total added amount of these additives is, based on 100 parts by mass of the base polymer, preferably 20 parts by mass or less, more preferably 10 parts by mass or less, and further preferably 5 parts by mass or less. In addition, these additives are usually used in the minimum necessary amount.

<<Type D Durometer Hardness of Base Polymer>>

The type D durometer hardness of the base polymer is preferably 10 to 60, more preferably 20 to 40, and further preferably 24 to 35. When the type D durometer hardness of the base polymer is within the above range, the expanded bead has high flexibility and excellent in-mold moldability.

The type D durometer hardness of the base polymer is measured using a type D durometer based on JIS K 7215: 1986.

Compared with polypropylene resins, polyethylene-based resins, and the like, which are general crystalline resins, thermoplastic olefinic elastomers tend to have more amorphous portions and be more prone to the formation of sink marks due to shrinkage of the expanded bead as a result of overheating during molding. Further, in general, in a mold used for molding an expanded beads molded article having a large thickness difference and a complicated shape, uneven heating of the expanded bead is more likely to occur due to variations in the filling degree of the expanded bead. Therefore, in particular, when a thermoplastic olefinic elastomer expanded bead is molded using a mold having a complicated shape with a large thickness difference to try to obtain a molded article, sink marks are more likely to occur at the thick portions where the amount of the expanded beads per unit volume tends to be small.

Further, when the particle diameter of the expanded bead is simply reduced in order to improve fillability into the mold, the heat of fusion per expanded bead becomes small, the amount of the expanded beads per unit volume particularly at the thick portions in the mold is smaller than that at the thin portions, and therefore the expanded beads molded article is more likely to produce sink marks due to heat shrinkage, and recoverability has tended to be inferior. On the other hand, at the thin portions of the mold, the amount of the expanded beads per unit volume is larger, so the amount of heat required to melt the surface of the expanded bead is larger, and the fusion bondability of the expanded beads molded article has tended to deteriorate more easily. Further, in order to improve the fillability into the mold, when the expanded bead is filled in the mold by cracking-filling, in a mold having a complicated shape, the cracking amount (%) differs between the thick portions and the thin portions. Therefore, the above-mentioned deterioration in the recoverability and fusion bondability of an expanded beads molded article has been more pronounced. Therefore, it has been difficult to achieve both recoverability and fusion bondability of an expanded beads molded article having a large thickness difference and a more complicated shape simply by reducing the particle diameter of the expanded bead.

By setting such that the expanded bead of the present invention has an average particle diameter and a heat of fusion in specific ranges, and such that the difference between the melting point and the crystallization temperature of the expanded bead is in a specific range, an expanded bead can be provided that is capable of molding an expanded beads molded article that can achieve both recoverability and fusion bondability and that has excellent durability even when molded in a mold that can obtain a molded article having large thickness difference and a more complicated shape. As used herein, a filling method in which, in order to efficiently fill the expanded bead into the mold cavity, the expanded bead is filled with the mold slightly open, the mold is then closed, and forming is performed in a mechanically compressed state, is referred to as "cracking filling". Further, the ratio of the movement distance (mm) of the mold when closing the mold to the thickness (mm) in the cavity of the mold is expressed as the cracking amount (%).

<Physical Properties of Expanded Bead>

<<Average Particle Diameter of Expanded Bead>>

The average particle diameter of the expanded bead is 0.5 to 5 mm, preferably 0.8 to 4.5 mm, more preferably 1 to 4 mm, and further preferably 2 to 3.8 mm. By setting the average particle diameter of the expanded bead to within the above range, the expanded bead has excellent fillability and even with a mold used for molding an expanded beads molded article having a large thickness difference and a complicated shape and is capable of molding an expanded beads molded article having excellent durability. In particular, when the average particle diameter of the expanded bead is 1 to 4 mm, even for a molded article that has a thin portion of a thickness of 5 mm or less or a molded article that has an even larger thickness difference, an expanded beads molded article having excellent surface properties, fusion bondability, and the like can be molded.

The average particle diameter of the expanded bead is a value calculated by the following method. First, based on a volume-based particle size distribution of the expanded bead, a number-based particle size distribution is obtained by assuming the particle shape to be a sphere and converting into a number-based particle size distribution. Then, a number-based arithmetic average particle diameter can be determined by arithmetically averaging the particle diameters based on the number-based particle size distribution. As used herein, particle diameter means the diameter of a virtual sphere having the same volume as the particle.

The volume-based particle size distribution of the expanded bead can be measured using a particle size distribution measuring device (for example, "Millitrack JPA" manufactured by Nikkiso Co., Ltd.). The number of expanded beads used for the measurement may be, for example, 2000 or more.

<<Average Mass of Expanded Bead>>

The average mass of the expanded bead is, from the viewpoint of fillability into the mold and the like, preferably 0.5 to 6 mg, more preferably 0.8 to 5 mg, further preferably 1 to 4.5 mg, and even further preferably 1 to 4 mg.

The average mass of the expanded bead can be calculated by randomly selecting 100 or more of the expanded bead, measuring the mass [mg] of that expanded bead group, and dividing by the number of expanded beads used for the measurement.

<<Relationship between Average Particle Diameter and Average Mass of Expanded Bead>>

The product $[(D) \times (W)]$ of the average particle diameter (D) and the average mass (W) of the expanded bead is preferably 25 or less, more preferably 15 or less, further preferably 10 or less, and particularly preferably 8 or less. When the product $[(D) \times (W)]$ is 25 or less, the expanded bead has excellent fillability into the mold and a molded article having excellent durability can be molded. In particular, when the product of the average particle diameter and the average mass of the expanded bead is 15 or less, it is possible to mold an expanded beads molded article having excellent surface properties, fusion bondability, and the like even when the molded article has an even larger thickness difference. The lower limit of the product $[(D) \times (W)]$ is generally 2 or more, and preferably 5 or more.

From the viewpoint of further improving moldability when molded in a mold that can obtain a molded article having a large thickness difference and a more complicated shape, it is preferable that the average particle diameter (D) of the expanded bead is 1 to 4 mm, the average mass (W) of the expanded bead is 1 to 4 mg, and the product $[(D) \times (W)]$ of the average particle diameter (D) and the average mass (W) of the expanded bead is 15 or less.

<<Heat of Fusion of Expanded Bead>>

The heat of fusion of the expanded bead is 60 to 80 J/g. When the heat of fusion of the expanded bead is 60 J/g or more, particularly at the thick portions of the molded article, it is possible to suppress the occurrence of sink marks due to heat shrinkage, and it is possible to mold an expanded beads molded article having excellent dimensional accuracy. On the other hand, when the heat of fusion of the expanded bead is 80 J/g or less, particularly at the thin portions of the molded article, it is possible to suitably prevent deterioration of the fusion bondability. From the same viewpoint, the heat of fusion of the expanded bead is preferably 62 to 78 J/g, and more preferably 65 to 75 J/g.

The heat of fusion of the expanded bead is measured by the same method as that described above for the heat of fusion of the TPO.

The method of adjusting the heat of fusion of the expanded bead to the above-mentioned specific range is not limited to the method of using the above-mentioned mixture of the thermoplastic olefinic elastomer and the polyethylene-based resin as the base polymer.

<<Difference [Tm−Tc] between Melting Point (Tm) and Crystallization Temperature (Tc) of Expanded Bead>>

The difference [Tm−Tc] between the melting point (Tm) and the crystallization temperature (Tc) of the expanded bead is 20° C. or lower. When the difference [Tm−Tc] is in the above range, the occurrence of sink marks can be suppressed even in the thick portions of a molded article that is particularly prone to the occurrence of sink marks due to heat shrinkage. As a result, an expanded bead having excellent moldability can be obtained even when molding a molded article having a large difference in thickness and a more complicated shape. From this viewpoint, the difference [Tm−Tc] is preferably 18° C. or lower, and more preferably 15° C. or lower. The lower limit of the difference [Tm−Tc] is usually preferably 5° C. or higher.

The melting point (Tm) and crystallization temperature (Tc) of the expanded bead are measured by the same method as that described above for the TPO.

<<Crystallization Temperature (Tc) of Expanded Bead>>

The crystallization temperature (Tc) of the expanded bead is preferably 105° C. or higher, and more preferably 110° C. or higher. When the crystallization temperature (Tc) of the expanded bead is 105° C. or higher, the expanded beads constituting the molded article are crystallized faster, the binding force by the crystallized portions suppresses deformation due to decompression during the production of the molded article, and recoverability is excellent. Further, from the viewpoint of setting the difference [Tm−Tc] between the melting point (Tm) and the crystallization temperature (Tc) of the expanded bead in the specific range and obtaining an expanded bead capable of molding a molded article having a large thickness difference and a complicated shape, the crystallization temperature (Tc) of the expanded bead is preferably 105 to 120° C., and more preferably 110 to 120° C.

The method of adjusting the difference [Tm−Tc] between the melting point (Tm) and the crystallization temperature (Tc) of the expanded bead to within the above specific range is not limited to a method of using the above-mentioned mixture of the thermoplastic olefinic elastomer and the polyethylene-based resin as the base polymer. For example, the method may be performed by adding a crystal nucleating agent such as silica and talc to the base polymer.

<<Xylene Insoluble Content Obtained by Thermal Xylene Extraction of Expanded Bead (Xylene Insoluble Content)>>

The xylene insoluble content of the expanded bead obtained by thermal xylene extraction (xylene insoluble content) is preferably 30 to 70% by mass, and more preferably 40 to 60% by mass. The xylene insoluble content obtained by thermal xylene extraction is one of the indicators showing the crosslinked state of the expanded bead.

The xylene insoluble content of the expanded bead is calculated as follows. Approximately 1 g of a sample is weighed (the weighed sample mass is taken as G1 [g]), boiled in 100 g of xylene for 6 hours, quickly filtered through a 100 mesh wire mesh, then the boiling xylene insoluble content remaining on the wire mesh is dried in a vacuum drier at 80° C. for 8 hours, the mass of the boiled xylene insoluble content is then weighed (the weighed mass of the boiled xylene insoluble content is taken as G2 [g]), and the xylene insoluble content is calculated by Expression 3.

$$\text{Xylene insoluble content (\% by mass)} = [G2/G1] \times 100 \quad \text{(Expression 3)}$$

<<Apparent Density of Expanded Bead>>

The apparent density of the expanded bead is preferably 30 to 150 kg/m³, and more preferably 40 to 140 kg/m³. When the apparent density of the expanded bead is within the above range, lightness, recoverability, and the like are excellent.

The apparent density of the expanded bead is calculated as follows. A group of the expanded bead is left for 2 days under a relative humidity of 50%, a temperature of 23° C., and 1 atm. Next, a graduated cylinder containing water having a temperature of 23° C. is prepared, and an arbitrary amount of the expanded bead group (mass W1 [g] of the expanded bead group) is placed in the water in the graduated cylinder using a tool such as a wire mesh and caused to sink. Then, considering the volume of the tool such as the wire mesh, the volume V1 [L] of the expanded bead group read from the rise in the water level is measured. The apparent density of the expanded bead can be calculated by dividing the mass W1 [g] of the expanded bead group placed in the graduated cylinder by the volume V1 [L] to obtain (W1/V1), and then converting to units of [kg/m³].

<<Bulk Density of Expanded Bead>>

The bulk density of the expanded bead is, from the viewpoint of lightness and the like, preferably 10 to 110 kg/m³, more preferably 20 to 100 kg/m³, and further preferably 30 to 90 kg/m³.

The bulk density of the expanded bead is calculated as follows. The expanded bead is filled into in a container such as a graduated cylinder by allowing the expanded bead to freely fall into the container. The container is then vibrated, and the graduation when the volume reaches a constant volume is read and determined as the bulk volume [L] of the expanded bead. The bulk density of the expanded bead is calculated by dividing the total mass [g] of the expanded beads filled in the container by the bulk volume [L] and converting into units of [kg/m³].

<Method for Producing Expanded Bead>

The method for producing the expanded bead of the present invention can be carried out by a method including the following step (A), step (B), step (C), and step (D).

Step (A): A dispersion step of dispersing particles having a TPO as a base polymer (hereinafter, also referred to as "base particles") and a cross-linking agent in a dispersion medium in a closed container.

Step (B): A cross-linking step of heating to a temperature (cross-linking temperature) equal to or higher than the temperature at which the TPO softens and the cross-linking agent substantially decomposes, and cross-linking the base particles to obtain crosslinked particles.

Step (C): An impregnation step of impregnating the crosslinked particles with a blowing agent by holding the crosslinked particles at a predetermined temperature (impregnation temperature) for a predetermined time (impregnation time).

Step (D): A foaming step of producing an expanded bead by releasing and foaming the crosslinked particles impregnated with the blowing agent that have been heated to a predetermined temperature (foaming temperature) from the closed container into an atmosphere having a pressure lower than the pressure in the closed container.

[Step (A)]

In step (A), the base particles and the cross-linking agent are dispersed in a dispersion medium in a closed container. The closed container is a container that can be closed and can withstand heating and an increase in pressure. Examples of the closed container include an autoclave and the like.

The TPO is fed into an extruder and kneaded to form a melt-kneaded product. The melt-kneaded product is extruded in a strand from a small hole of a die attached to the tip of the extruder, and base particles are produced by a known granulation method, such as a strand cutting method in which the strand is cut so as to have a predetermined mass. In this method, for example, the base particles can be obtained by cooling a melt-kneaded product extruded into a strand by water cooling and then cutting the strand to a predetermined length. When cutting to a predetermined length, for example, the base particles can be obtained by a hot-cutting method in which the melt-kneaded product is extruded immediately after being extruded, an underwater-cutting method in which the melt-kneaded product is cut in water, or the like.

The average mass per base particle is preferably 0.5 to 6 mg, more preferably 0.8 to 4 mg, further preferably 1 to 4 mg, and even further preferably 1.5 to 3.8 mg. The average mass of the base particles is a value obtained by dividing the mass [mg] of 100 randomly selected base particles by 100.

(Dispersion Medium)

The dispersion medium used in step (A) is not particularly limited as long as it is a dispersion medium that does not dissolve the base particle. Examples of the dispersion medium include water, ethylene glycol, glycerin, methanol, ethanol and the like, and the dispersion medium is preferably water.

(Dispersion)

The base particles are dispersed in the dispersion medium. For example, the base particles are dispersed in the dispersion medium using a stirrer.

In step (A), a dispersant or a surfactant may be further added to the dispersion medium. Examples of the dispersant include organic dispersants such as polyvinyl alcohol, polyvinylpyrrolidone, and methylcellulose; and sparingly soluble inorganic salts such as aluminum oxide, zinc oxide, kaolin, mica, magnesium phosphate and tricalcium phosphate. Examples of the surfactant include sodium oleate, sodium dodecylbenzene sulfonate, other anionic surfactants generally used in suspension polymerization, nonionic surfactants, and the like.

Further, in step (A), a pH adjusting agent can be added to the dispersion medium to adjust the pH of the dispersion medium. In addition, in step (A), a blowing agent can be added to the dispersion medium. The blowing agent will be described in detail in step (C).

The cross-linking agent may be added to the dispersion medium in advance, or may be added to the dispersion medium after the base particle has been dispersed. The cross-linking agent is not particularly limited as long as it crosslinks the TPO. As the cross-linking agent, it is preferable to use a peroxide having a 10-hour half-life temperature of 100 to 125° C., such as dicumyl peroxide (10-hour half-life temperature: 116° C.) and 2, 5-t-butylperbenzoate (10-hour half-life temperature: 104° C.). These may be used alone or in combination of two or more. The amount of the cross-linking agent blended into the dispersion medium is not particularly limited as long as the content ratio of xylene insoluble content in the expanded bead can be adjusted to within the above-mentioned range, but the blending amount of the cross-linking agent is, based on 100 parts by mass of the base particle, preferably 0.1 to 5.0 parts by mass, and more preferably 0.2 to 2.5 parts by mass.

[Step (B)]

In step (B), the base particles dispersed in the dispersion medium in step (A) are softened in a closed container, heated to a temperature (cross-linking temperature) higher than the temperature at which the cross-linking agent substantially decomposes, and held for a predetermined time (holding time). As a result, cross-linking of the TPO occurs and crosslinked particles are obtained. The cross-linking temperature is not particularly limited, but is, for example, in the range of 100 to 170° C. The holding time at the cross-linking temperature is not particularly limited, but is, for example, 5 to 120 minutes, and more preferably 10 to 90 minutes.

[Step (C)]

In step (C), after step (B), a blowing agent for foaming the crosslinked particles is added to the dispersion medium in the closed container, and the softened crosslinked particles are impregnated with the blowing agent. The impregnation temperature is not particularly limited as long as it is a temperature equal to or higher than the temperature at which the crosslinked particles soften, but is, for example, in the range of 100 to 170° C. The impregnation time is preferably 15 to 60 minutes, and more preferably 30 to 45 minutes.

(Blowing agent)

The blowing agent used in step (C) is not particularly limited as long as it can foam the crosslinked particles. Examples of the blowing agent include inorganic physical blowing agents such as air, nitrogen, carbon dioxide, argon, helium, oxygen, and neon; aliphatic hydrocarbons such as propane, normal butane, isobutane, normal pentane, isopentane, and normal hexane; alicyclic hydrocarbons such as cyclohexane and cyclopentane; halogenated hydrocarbons such as chlorofluoromethane, trifluoromethane, 1,1-difluoroethane, 1,1,1,2-tetrafluoroethane, methyl chloride, ethyl chloride, and methylene chloride; organic physical blowing agents such as dimethyl ether, diethyl ether, and dialkyl ethers such as methyl ethyl ether, and the like. Among these, an inorganic physical blowing agent that does not destroy the ozone layer and is inexpensive is preferable, nitrogen, air, and carbon dioxide are more preferable, and carbon dioxide is particularly preferable. These can be used alone or in combination of two or more. The blending amount of the blowing agent is determined in consideration of the apparent density of the target expanded bead, the type of TPO, the type of polyethylene-based resin, the type of blowing agent, and the like. Usually, it is preferable to use, based on 100 parts by mass of the crosslinked particles, 5 to 50 parts by mass of an organic physical blowing agent or 0.5 to 30 parts by mass of an inorganic physical blowing agent. The above-mentioned crosslinking step, impregnation step, and foaming step are preferably performed as a series of steps in a single closed container.

[Step (D)]

In step (D), crosslinked particles impregnated with a blowing agent and then heated in step (C) are released into an atmosphere having a pressure lower than the pressure in the closed container to prepare expanded beads. Specifically, while maintaining the pressure inside the closed container at a pressure equal to or higher than the vapor pressure of the blowing agent, expanded beads are prepared by opening one end of the closed container under the water surface, and causing the crosslinked particles to foam by releasing the crosslinked particles impregnated with the blowing agent together with the dispersion medium from the inside of the container under an atmosphere lower than the pressure inside the closed container, usually under atmospheric pressure.

As a method for producing the expanded bead, a method for producing in a closed container has been described, but the method for producing the expanded bead is not limited to the production method described above. For example, the expanded bead may be produced by a method in which a foamed body of the crosslinked particles is produced by feeding the base particle, the cross-linking agent, and the blowing agent into the extruder to melt, whereby the base particle crosslinks, the blowing agent is impregnated, the crosslinked particles are then extruded and foamed from a die attached to the tip of the extruder, and the foamed crosslinked particles are cooled and then cut into particles by pelletizing; or by a method in which the crosslinked particles obtained in steps (A) to (C) are taken out from the closed container, dehydrated and dried, and then the crosslinked particles are heated by a heating medium and foamed to form the expanded bead. Further, although a method in which cross-linking is carried out using an organic peroxide for the base particle has been illustrated, the cross-linking step in the present invention is not limited to using an organic peroxide, and the crosslinked particles can be obtained by using some other known method, such as an electron beam cross-linking method, to carry out the cross-linking step.

<Expanded Beads Molded Article>

The thermoplastic olefinic elastomer expanded beads molded article of the present invention is constituted from an expanded bead comprising a thermoplastic olefinic elastomer as a base polymer. The expanded bead has a heat of fusion of 60 to 80 J/g. A difference [(Tm)–(Tc)] between a melting point (Tm) of the expanded bead and a crystallization temperature (Tc) of the expanded bead measured by heat flux differential scanning calorimetry (DSC) by heating the expanded bead from 30° C. to 200° C. at a heating rate of 10° C./min and then cooling from 200° C. to 30° C. at a cooling rate of 10° C./min is 20° C. or lower. The number of expanded beads per unit area on a surface of the expanded beads molded article is 3 to 30 particles/cm$^2$. The expanded beads molded article preferably satisfies the following relationship (Expression 1);

$$15 \leq A \times B \qquad \text{(Expression 1)}$$

A; Tensile strength (MPa) of the expanded beads molded article.

B: Tensile elongation (%) of the expanded beads molded article.

The thermoplastic olefinic elastomer expanded beads molded article of the present invention can be obtained by in-mold molding the above-mentioned expanded bead.

(In-Mold Molding)

The expanded beads molded article can be obtained by filling a mold with the expanded bead by a conventionally known method, and heat-forming using a heating medium such as steam. Specifically, the expanded bead is filled in the mold, and a heating medium such as steam is then introduced into the mold to heat the expanded bead, whereby the particles undergo secondary foaming and fuse with each other to form an expanded beads molded article in which the shape of the molding space has been enlarged. Further, the in-mold molding of the present invention is preferably carried out by pressurizing the expanded bead in advance with a pressurized gas such as air to increase the pressure in the expanded bead, adjusting the pressure in the expanded bead to 0.01 to 0.2 MPa (G) (G: gauge pressure, the same applies hereinafter), then filling the expanded bead into the cavity of the mold under atmospheric pressure or reduced pressure, closing the mold, and then carry out the molding by a pressure-molding method (for example, JP S51-22951) in which a heating medium such as steam is supplied into the mold to heat and fuse the expanded bead.

<<Apparent Density of Expanded Beads Molded Article>>

The apparent density of the expanded beads molded article is preferably 20 to 300 kg/m$^3$, more preferably 30 to 150 kg/m$^3$, further preferably 35 to 120 kg/m$^3$, and even further preferably 40 to 100 kg/m$^3$. When the apparent density of the expanded beads molded article is within the above range, lightness, recoverability, and fusion bondability are excellent.

The apparent density of the expanded beads molded article is calculated as follows. The expanded beads molded article is left for 2 days under a relative humidity of 50%, a temperature of 23° C., and 1 atm. Next, a container containing water having a temperature of 23° C. is prepared, and an arbitrary amount of the expanded beads molded article (mass W [g]) is placed in the water in the container using a tool such as a wire mesh and caused to sink. Then, considering the volume of the tool such as the wire mesh, the volume V [L] of the expanded beads molded article from the rise in the water level is measured. The apparent density of the expanded beads molded article can be calculated by dividing the mass W [g] of the expanded beads molded article placed in the container by the volume V [L] to obtain (W/V), and then converting to units of [kg/m$^3$].

<<Number of Expanded Beads on Surface of Expanded Beads Molded Article>>

In the expanded beads molded article of the present invention, the number of expanded beads per unit area on the surface of the molded article is 3 to 30 particles/cm$^2$. When the number of expanded beads per unit area on the surface of the molded article is 3 to 30 particles/cm$^2$, the expanded beads molded article has excellent surface properties and fusion bondability, and also has excellent durability. From the viewpoint of further improving the durability of the expanded beads molded article, the number of expanded beads per unit area on the molded article surface is preferably 5 particles/cm$^2$ or more, and more preferably 6.5 particles/cm$^2$ or more. Further, the number of expanded beads per unit area on the surface of the molded article is preferably 20 particles/cm$^2$ or less, more preferably 15 particles/cm$^2$ or less, and further preferably 13 particles/cm$^2$ or less.

The number of expanded beads on the surface of the expanded beads molded article is measured by the following method. The number of expanded beads present in the range of a 100 mm×100 mm square is counted at five or more points on the surface of the expanded beads molded article excluding the edges. This value is converted into a value per unit area (cm$^2$), and calculated by arithmetic averaging. In the case of expanded beads present on the line of the above-described range, only expanded beads intersecting two adjacent sides are counted, and expanded beads intersecting the other two sides are not counted.

<<Tensile Properties of Expanded Beads Molded Article>>

The expanded beads molded article of the present invention has a product of the tensile strength (A) [MPa] and the tensile elongation (B) [%] of preferably 15 or more. In the present specification, the value of the product [(A)×(B)] may be used as an index of the durability of the expanded beads molded article. When the product [(A)×(B)] of the tensile strength (A) of the expanded beads molded article and the tensile elongation (B) of the expanded beads molded article is 15 or more, the durability is excellent. From this viewpoint, the product [(A)×(B)] is more preferably 45 or more.

From the viewpoint of more reliably exhibiting the flexibility owing to the TPO while maintaining the durability of the expanded beads molded article, the product [(A)×(B)] is preferably 140 or less, more preferably 135 or less, further preferably 100 or less.

Further, from the viewpoint of maintaining the flexibility owing to the TPO, the ratio of the tensile elongation (B) [%] to the apparent density [kg/m$^3$] of the expanded beads molded article is preferably 2.0 or more, more preferably 2.5 or more, and further preferably 3.0 or more.

The tensile strength and the tensile elongation of the expanded beads molded article are determined according to JIS K 6767: 1999 by using a vertical slicer to cut out a 120 mm x 25 mm x 10 mm cut-out piece so that all of the surfaces are cut from the expanded beads molded article, then using a jigsaw to prepare a dumbbell-shaped No. 1 test piece from the cut-out piece, and performing a tensile test on the test piece at a tensile speed of 500 mm/min. The maximum tensile stress at the time of tensile measurement and the elongation at break are taken as the tensile strength and the tensile elongation, respectively.

<<Type C Durometer Hardness of Expanded Beads Molded Article>>

The type C durometer hardness of the expanded beads molded article is preferably 5 to 70, more preferably 10 to 60, and further preferably 17 to 40. If the type C durometer hardness is within the above range, the expanded beads molded article has an excellent balance among flexibility, recoverability and the like.

The type C durometer hardness of the expanded beads molded article is measured using a type C durometer based on JIS K 7312: 1996.

<<Shrinkage Rate of Expanded Beads Molded Article>>

The shrinkage rate of the expanded beads molded article is, from the viewpoint of ease of producing the expanded beads molded article, preferably 10.0% or less, more preferably 8.0% or less, further preferably 7.6% or less, and even further preferably 7.0% or less.

The shrinkage of the expanded beads molded article is determined by measuring the longitudinal dimension of a aged expanded beads molded article obtained by drying a molded expanded beads molded article in an oven at 60° C. for 12 hours and then cooling to room temperature, and then calculating the shrinkage from the ratio of the difference between the longitudinal dimension of the mold and the longitudinal dimension of the expanded beads molded article with respect to the longitudinal dimension of the mold.

EXAMPLES

Hereinafter, the present invention will be described in detail with reference to examples, but the present invention is not limited to those examples.

The following measurements or evaluations were performed on the base polymer, expanded bead, and expanded beads molded article of each example and comparative example.

[Measurement Methods]

(Base Polymer and Expanded Bead)

<<Heat of Fusion of TPO, Polyethylene-Based Resin, and Expanded Bead>>

The heat of fusion of the TPO, polyethylene-based resin, and expanded bead was calculated based on JIS K 7122: 1987 from the melting peak of a DSC curve obtained by using a heat flux differential scanning calorimeter (manufactured by SII NanoTechnology Inc., model number: DSC7020) to raise the temperature of a test piece of about 3 mg from 23° C. to 200° C. at a heating rate of 10° C./min, then cool the temperature from 200° C. to 30° C. at a cooling rate of 10° C./min, then raise the temperature from 30° C. to 200° C. at a heating rate of 10° C./min. When a plurality of melting peaks appeared in the DSC curve, the total area of the plurality of melting peaks was taken as the heat of fusion.

<<Melting Point of TPO, Polyethylene-Based Resin, and Expanded Bead>>

The melting point of the TPO, polyethylene-based resin, and expanded bead was calculated based on JIS K 7121: 1987 by obtaining a DSC curve by adopting "(2) When the melting temperature is measured after performing a certain heat treatment" as the adjustment of the state of a test piece of about 3 mg, raising the temperature of the test piece from 23° C. to 200° C. at a heating rate of 10° C./min, then cooling the temperature from 200° C. to 30° C. at a cooling rate of 10° C./min, then raising the temperature from 30° C. to 200° C. at a heating rate of 10° C./min, observing the shape of the melting peak, and taking the peak temperature of the melting peak as the melting point of the test piece.

When a plurality of melting peaks appeared in the DSC curve, the peak temperature of the melting peak having the largest area was taken as the melting point.

<<Crystallization Temperature of TPO, Polyethylene-Based Resin, and Expanded Bead>>

The crystallization temperature of the TPO, polyethylene-based resin, and expanded bead was calculated, based on JIS K7121: 1987, from the crystallization peak of a DSC curve obtained by using a heat flux differential scanning calorimeter (manufactured by SII NanoTechnology Inc., model number: DSC7020) to raise the temperature of a test piece of about 3 mg from 23° C. to 200° C. at a heating rate of 10° C./min, and then cool the temperature from 200° C. to 30° C. at a cooling rate of 10° C./min. When a plurality of crystallization peaks appeared in the DSC curve, the peak temperature of the crystallization peak having the highest peak was taken as the crystallization temperature.

<<Density of TPO and Polyethylene-Based Resin>>

The density of the TPO and the polyethylene-based resin was measured according to ASTM D792-13.

<<Flexural Modulus of TPO and Polyethylene-Based Resin>>

The flexural modulus of the TPO and the polyethylene-based resin was measured according to JIS K 7171: 2016, by producing a sheet with a thickness of 4 mm by heat-pressing at 230° C., and cutting the sheet into pieces having a length of 80 mm, a width of 10 mm, and a thickness of 4 mm (standard test piece). The radius R1 of the indenter and the radius R2 of the support were both set to 5 mm, the distance between fulcrums was set to 64 mm, and the test speed was set to 2 mm/min.

<<140 Melt Flow Rate (MFR) of TPO and Polyethylene-Based Resin>>

The melt flow rate (MFR) of the TPO and the polyethylene-based resin was measured at a temperature of 190° C. and a load of 2.16 kg according to JIS K 7210-1: 1987.

<<Type D durometer hardness of base polymer>>

The type D durometer hardness of the base polymer was measured using a type D durometer (Asker Rubber Hardness Meter Type D, manufactured by Kobunshi Keiki Co., Ltd.) based on JIS K 7215: 1986. Specifically, a large number of base particles were heat-pressed to prepare a sheet having a length of 150 mm, a width of 150 mm, and a thickness of 4 mm, and the prepared sheet was used as a test piece. The type D durometer was attached to a constant pressure loader (CL-150L, manufactured by Kobunshi Keiki Co., Ltd.), measurements were taken at 10 arbitrary points on the sheet, and arithmetic averaging was performed to determine the type D durometer hardness.

<<Average Particle Diameter of Expanded Bead>>

According to the method described above, the volume-based particle size distribution of the expanded bead was measured by a particle size distribution measuring device ("Minitrack JPA", manufactured by Nikkiso Co., Ltd.) using about 3000 expanded beads. Based on this particle size distribution, the number-based particle size distribution was obtained by assuming the particle shape to be a sphere and converting into a number-based particle size distribution. The average particle diameter of the expanded bead was then calculated by arithmetically averaging the particle diameter based on this number-based particle size distribution.

<<Average Mass of Expanded Bead >>

The average mass of the expanded bead was calculated by randomly selecting 100 or more of the expanded bead, measuring the mass [mg] of that expanded bead group, and dividing by the number of expanded beads used for the measurement.

<<Xylene Insoluble Content Obtained by Thermal Xylene Extraction of Expanded Bead (Xylene Insoluble Content)>>

The xylene insoluble content of the expanded bead obtained by thermal xylene extraction (xylene insoluble content) was determined as follows. Approximately 1 g of a sample was weighed (the weighed sample mass was taken as G1 [g]), boiled in 100 g of xylene for 6 hours, quickly filtered through a 100 mesh wire mesh, then the boiling xylene insoluble content remaining on the wire mesh was dried in a vacuum drier at 80° C. for 8 hours, the mass of the boiled xylene insoluble content was then weighed (the weighed mass of the boiled xylene insoluble content was taken as G2 [g]), and the xylene insoluble content was calculated by Expression 3.

$$\text{Xylene insoluble content (\% by mass)} = [G_2/G_1] \times 100 \quad \text{(Expression 3)}$$

<<Apparent Density of Expanded Bead>>

The apparent density of the expanded bead was determined as follows. A group of the expanded bead was left for 2 days under a relative humidity of 50%, a temperature of 23° C., and 1 atm. Next, a graduated cylinder containing water having a temperature of 23° C. was prepared, and an arbitrary amount of the expanded bead group (mass W1 [g] of the expanded bead group) was placed in the water in the graduated cylinder using a tool such as a wire mesh and caused to sink. Then, considering the volume of the tool such as the wire mesh, the volume V1 [L] of the expanded bead group read from the rise in the water level was measured. The apparent density of the expanded bead was calculated by dividing the mass W1 [g] of the expanded bead group placed in the graduated cylinder by the volume V1 [L] to obtain (W1/V1), and then converting to units of [kg/m$^3$].

<<Bulk Density of Expanded Bead>>

The bulk density of the expanded bead was determined as follows. Expanded beads were filled into in a container such as a graduated cylinder by allowing the expanded beads to freely fall into the container. The container was then vibrated, and the graduation when the volume reached a constant volume was read and determined as the bulk volume [L] of the expanded beads. The bulk density of the expanded beads was calculated by dividing the total mass [g] of the expanded beads filled in the container by the bulk volume [L] and converting into units of [kg/m$^3$].

(Expanded Beads Molded Article)

<<Number of Expanded Beads on Surface of Expanded Beads Molded Article>>

The number of expanded beads on the surface of the expanded beads molded article was measured by the following method. The number of expanded beads present in the range of a 100 mm×100 mm square was counted at five or more points on the surface of the expanded beads molded article excluding the edges. This value was converted into a value per unit area (cm$^2$), and calculated by arithmetic averaging. In the case of expanded beads present on the line of the above-described range, only expanded beads intersecting two adjacent sides were counted, and expanded beads intersecting the other two sides were not counted.

<<Apparent Density of Expanded Beads Molded Article>>

The apparent density of the expanded beads molded article was determined as follows. The expanded beads molded article was left for 2 days under a relative humidity of 50%, a temperature of 23° C., and 1 atm. Next, a container containing water having a temperature of 23° C. was prepared, and an arbitrary amount of the expanded beads molded article (mass W [g]) was placed in the water in the container using a tool such as a wire mesh and caused to sink. Then, considering the volume of the tool such as the wire mesh, the volume V [L] of the expanded beads molded article from the rise in the water level was measured. The apparent density of the expanded beads molded article was calculated by dividing the mass W [g] of the expanded beads molded article placed in the container by the volume V [L] to obtain (W/V), and then converting to units of [kg/m$^3$].

<<Type C Durometer Hardness of Expanded Beads Molded Article>>

The type C durometer hardness of the expanded beads molded article was measured using a type C durometer based on JIS K 7312: 1996. Specifically, durometer C (Asker Rubber Hardness Meter Type C, manufactured by Kobunshi Keiki Co., Ltd.) was attached to a constant pressure loader (CL-150L, manufactured by Kobunshi Keiki Co., Ltd.), measurements were taken at 10 arbitrary points on both sides of the expanded beads molded article excluding the edge portions, and arithmetic averaging was performed to determine the type C durometer hardness.

<<Shrinkage Rate of Expanded Beads Molded Article>>

The shrinkage rate of the expanded beads molded article was determined by measuring a longitudinal dimension ($L_B$) of a aged expanded beads molded article obtained by drying an expanded beads molded article molded using a flat mold having a length of 250 mm, a width of 200 mm, and a thickness of 50 mm in an oven at 60° C. for 12 hours and then cooling to room temperature, and then calculating the shrinkage from the ratio (($L_A - L_B$)/$L_A \times 100$) of the difference between the longitudinal dimension of the mold and the longitudinal dimension of the expanded beads molded article with respect to the longitudinal dimension ($L_A$) of the mold.

<<Tensile Properties of Expanded Beads Molded Article>>

The tensile strength and the tensile elongation of the expanded beads molded article were determined according to JIS K 6767: 1999 by using a vertical slicer to cut out a 120 mm×25 mm×10 mm cut-out piece so that all of the surfaces are provided by cutting out from the expanded beads molded article, then using a jigsaw to prepare a dumbbell-shaped No. 1 test piece from the cut-out piece, and performing a tensile test on the test piece at a tensile speed of 500 mm/min. The maximum tensile stress at the time of tensile measurement and the elongation at break were taken as a tensile strength (A) and a tensile elongation (B), respectively. Further, the product of the tensile strength (A) and the tensile elongation (B) was calculated.

In addition, the ratio of the tensile elongation (B) to the apparent density of the expanded beads molded article obtained by the above method was calculated.

[Evaluation Methods]

(Moldability of Expanded Bead)

The following evaluations were carried out on the moldability of the expanded beads of the examples and comparative examples. In addition, as used herein, "moldability " means a comprehensive evaluation of the fusion bondability, surface properties (secondary foamability), and recoverability, and is evaluated based on the following criteria.

A: All of the fusion bondability, surface properties (secondary foamability), and recoverability in the comprehensive evaluation are A.

B: One or more of fusion bondability, surface properties (secondary foamability), and recoverability in the comprehensive evaluation is B.

<<Fusion Bondability>>

The fusion bondability of the expanded beads molded article were evaluated by the following method. The expanded beads molded article was fractured by bending, and the number of expanded beads (C1) and the number of fractured expanded beads (C2) present on a fracture surface were determined. The ratio (C2/C1×100) of fractured expanded beads to expanded beads was calculated as the material destruction rate. The measurement was performed 5 times using different test pieces, the material destruction rate of each test piece was calculated, and the fusion bondability were evaluated based on the following criteria by arithmetically averaging the five material destruction rates.

range in which molding is possible and that can produce a molded article with better moldability when produced using a mold having a thickness difference such that the cracking amount differs depending on the site. Further, an expanded bead that can be molded with a small cracking amount can be determined as being is an expanded bead that has excellent moldability in the thick portion having a thickness difference, and an expanded bead that can be molded with a large cracking amount can be determined as being an expanded bead that has excellent moldability in the thin portion having a thickness difference.

<Preparation of Expanded Beads and Expanded Beads Molded Article>

Table 1 shows the TPO and polyethylene-based resin (PE) mainly used to prepare the expanded bead.

TABLE 1

| | Product name | Manufacturer | Heat of fusion (J/g) | Melting point (° C.) | Crystallization temperature (° C.) | Density (kg/m³) | Flexural modulus (MPa) | MFR (g/10 min) | Difference in MFR with TPO [(II) − (I)] (g/10 min) | |
| | | | | | | | | | Difference in MFR with TPO1 | Difference in MFR with TPO2 |
| --- | --- | --- | --- | --- | --- | --- | --- | --- | --- | --- |
| TPO1 | INFUSE 9530 | Dow Chemical | 58 | 121 | 100 | 887 | 28 | 5 | — | — |
| TPO2 | INFUSE 9500 | Dow Chemical | 45 | 120 | 99 | 877 | 13 | 6 | — | — |
| HDPE1 | Niporon Hard 1200 | Tosoh | 176 | 128 | 114 | 952 | 820 | 21 | 16 | 15 |
| HDPE2 | DOW 17450N | Dow Chemical | 166 | 130 | 115 | 950 | 850 | 17 | 12 | 11 |
| LLDPE | Sumikathene-L GA802 | Sumitomo Chemical | 108 | 119 | 104 | 935 | 410 | 20 | 15 | 14 |

A: Material destruction rate is 90% or more
B: Material destruction rate is less than 90%

<<Surface Properties (Secondary Foamability)>>

A 100 mm×100 mm rectangle was drawn in the center of the expanded beads molded article, a diagonal line was drawn from the corners of the rectangular area, and the number of voids (gap) with a size of 1 mm×1 mm or more on that line was counted. The surface properties (secondary foamability) of the expanded beads molded article were evaluated as follows.

A: Number of voids is less than 3
B: Number of voids is 3 or more

<<Recoverability>>

The thicknesses of the central part and the four corners of the obtained expanded beads molded article were measured, the ratio of the thickness of the central part to the thickest part of the four corners was calculated, and the recoverability was evaluated as follows.

A: Thickness ratio is 95% or more
B: Thickness ratio is less than 95%

<<Cracking Amount (Compression Ratio) Range in which Forming is Possible>>

The cracking amount during in-mold molding was changed, and the fusion bondability, surface properties (secondary foamability), and recoverability were evaluated. The cracking amount range in which an expanded beads molded article evaluated as "A" for all of fusion bondability, surface properties (secondary foamability), and recoverability could be formed was taken as the cracking amount (compression ratio) range (%) in which forming is possible.

An expanded bead with good moldability for a plurality of cracking amounts can be determined as being an expanded bead that has a wide cracking amount (compression ratio)

Example 1

<Preparation of Expanded Bead>

A base polymer raw material consisting of 80% by mass of TPO1 as the TPO and 20% by mass of HDPE1 as the PE (however, the total of the TPO and the PE is 100% by mass) and, as a cell controlling agent, 0.1 parts by mass of zinc borate (ZnB, manufactured by Tomita Pharmaceutical Co., Ltd., Zinc Borate 2335, average particle diameter 6 μm) based on 100 parts by mass of the mixed raw material were charged into an extruder, melt-kneaded at 230° C., and extruded into a strand from a φ2 mm die. After cooling in water, base particles were obtained by cutting the strand with a pelletizer and granulating to a particle mass of 2.0 mg. 1 kg of the base particles, 3 liters of water as a dispersion medium, 3 g of kaolin as a dispersant, 0.04 g of sodium alkylbenzene sulfonate, and 0.90 parts by mass of dicumyl peroxide as a cross-linking agent based on 100 parts by mass of the base particle were added to a closed container having a volume of 5 L, the closed container was sealed, and then stirring was started. Then, 1.5 MPa of carbon dioxide as a blowing agent was added under pressure into the closed container, the temperature was raised to 110° C., and the temperature was maintained for 30 minutes. Then, the temperature was raised to 160° C., which is the cross-linking temperature/foaming temperature, under stirring, the mixture was held for 30 minutes together with adding more carbon dioxide under pressure as a blowing agent to impregnate the base particles. The pressure (vapor pressure) in the autoclave at this time was 4.0 MPa (G). Then, while maintaining the pressure, the contents in the closed container were released under atmospheric pressure to obtain expanded beads. Using the obtained expanded beads, the average mass, average particle diameter, heat of fusion, melting point (Tm), crystallization temperature (Tc), xylene insoluble content, apparent density, and bulk density of the expanded beads were measured, and the difference [Tm–Tc] was calculated. The results are shown in Table 2.

<Preparation of Expanded Beads Molded Article>

The expanded beads were charged into a closed container, pressurized with compressed air of 0.2 MPa (G) for 12 hours to apply an internal pressure of 0.10 MPa (G) onto the expanded bead. The expanded beads were taken out and filled into a flat mold having a length of 250 mm, a width of 200 mm, and a thickness of 20 mm (cracking amount 20%), steam-heated at a molding pressure of 0.20 MPa (G), cooled, subjected to in-mold molding for removing the molded article from the mold, and then heat-dried and aged in an oven adjusted to 60° C. for 12 hours. The molded article was then taken out from oven to obtain an expanded beads molded article. Using the obtained expanded beads molded article, the apparent density, shrinkage rate, type C durometer hardness, tensile strength (A), and tensile elongation (B) of the expanded beads molded article were measured, and the product [(A)×(B)] and the ratio [(B)/apparent density] were calculated. The results are shown in Table 2.

Example 2

Expanded beads and an expanded beads molded article were obtained in the same manner as in Example 1 except that the amount of dicumyl peroxide added as a cross-linking agent was changed from 0.90 parts by mass to 0.95 parts by mass based on 100 parts by mass of the base particle and the internal pressure (vapor pressure) in the autoclave when carbon dioxide was impregnated as a blowing agent was changed from 4.0 MPa (G) to 3.5 MPa (G). The results are shown in Table 2.

Example 3

Expanded beads and an expanded beads molded article were obtained in the same manner as in Example 1 except that the particle mass cut by the pelletizer was changed from 2.0 mg to 3.0 mg and the internal pressure (vapor pressure) in the autoclave when carbon dioxide was impregnated as a blowing agent was changed from 4.0 MPa (G) to 2.5 MPa (G). The results are shown in Table 2.

Example 4

Expanded beads and an expanded beads molded article were obtained in the same manner as in Example 1 except that the particle mass cut by the pelletizer was changed from 2.0 mg to 5.0 mg, the amount of dicumyl peroxide added as a cross-linking agent was changed from 0.90 parts by mass to 0.85 parts by mass based on 100 parts by mass of the base particle, and the internal pressure (vapor pressure) in the autoclave when carbon dioxide was impregnated as a blowing agent was changed from 4.0 MPa (G) to 2.5 MPa (G). The results are shown in Table 2.

Example 5

Expanded beads and an expanded beads molded article were obtained in the same manner as in Example 1 except that the PE of the base polymer raw material was changed from HDPE1 to HDPE2 and the internal pressure (vapor pressure) in the autoclave when carbon dioxide was impregnated as a blowing agent was changed from 4.0 MPa (G) to 2.5 MPa (G). The results are shown in Table 2.

Example 6

Expanded beads and an expanded beads molded article were obtained in the same manner as in Example 1 except that the blending amount of TPO1 in the base polymer raw material was changed from 80% by mass to 95% by mass, the blending amount of HDPE1 was changed from 20% by mass to 5% by mass, the amount of dicumyl peroxide added as a cross-linking agent was changed from 0.90 parts by mass to 0.85 parts by mass based on 100 parts by mass of the base particle, and the internal pressure (vapor pressure) in the autoclave when carbon dioxide was impregnated as a blowing agent was changed from 4.0 MPa (G) to 2.5 MPa (G). The results are shown in Table 2.

Example 7

Expanded beads and an expanded beads molded article were obtained in the same manner as in Example 1 except that the PE of the base polymer was changed from HDPE1 to LLDPE and the internal pressure (vapor pressure) in the autoclave when carbon dioxide was impregnated as a blowing agent was changed from 4.0 MPa (G) to 2.5 MPa (G). The results are shown in Table 2.

Example 8

Expanded beads and an expanded beads molded article were obtained in the same manner as in Example 1 except that the TPO of the base polymer was changed from TPO1 to TPO2, the amount of dicumyl peroxide added as a cross-linking agent was changed from 0.90 parts by mass to 0.95 parts by mass based on 100 parts by mass of the base particle, and the internal pressure (vapor pressure) in the autoclave when carbon dioxide was impregnated as a blowing agent was changed from 4.0 MPa (G) to 3.5 MPa (G). The results are shown in Table 2.

Comparative Example 1

Expanded beads and an expanded beads molded article were obtained in the same manner as in Example 1 except that, in the base polymer, PE was not used, the blending amount of TPO1 was changed to 100% by mass, the amount of dicumyl peroxide added as a cross-linking agent was changed from 0.90 parts by mass to 0.80 parts by mass based on 100 parts by mass of the base particle and the internal pressure (vapor pressure) in the autoclave when carbon dioxide was impregnated as a blowing agent was changed from 4.0 MPa (G) to 3.5 MPa (G). The results are shown in Table 3.

Comparative Example 2

Expanded beads and an expanded beads molded article were obtained in the same manner as in Comparative Example 1 except that the particle mass cut by the pelletizer was changed from 2.0 mg to 3.0 mg and the internal pressure (vapor pressure) in the autoclave when carbon dioxide was impregnated as a blowing agent was changed from 3.5 MPa (G) to 2.5 MPa (G). The results are shown in Table 3.

Comparative Example 3

Expanded beads and an expanded beads molded article were obtained in the same manner as in Example 1 except that the particle mass cut by the pelletizer was changed from 2.0 mg to 8.0 mg, the amount of dicumyl peroxide added as a cross-linking agent was changed from 0.90 parts by mass to 0.85 parts by mass based on 100 parts by mass of the base particle, and the internal pressure (vapor pressure) in the autoclave when carbon dioxide was impregnated as a blowing agent was changed from 4.0 MPa (G) to 3.0 MPa (G). The results are shown in Table 3.

Comparative Example 4

Expanded beads and an expanded beads molded article were obtained in the same manner as in Example 1 except that the blending amount of TPO1 in the base polymer raw material was changed from 80% by mass to 70% by mass, the blending amount of HDPE1 was changed from 20% by mass to 30% by mass, the amount of dicumyl peroxide added as a cross-linking agent was changed from 0.90 parts by mass to 0.95 parts by mass based on 100 parts by mass of the base particle, and the internal pressure (vapor pressure) in the autoclave when carbon dioxide was impregnated as a blowing agent was changed from 4.0 MPa (G) to 2.5 MPa (G). The results are shown in Table 3.

Comparative Example 5

Expanded beads and an expanded beads molded article were obtained in the same manner as in Example 1 except that the blending amount of TPO1 in the base polymer raw material was changed from 80% by mass to 50% by mass, the blending amount of HDPE1 was changed from 20% by mass to 50% by mass, the amount of dicumyl peroxide added as a cross-linking agent was changed from 0.90 parts by mass to 1.0 parts by mass based on 100 parts by mass of the base particle, and the internal pressure (vapor pressure) in the autoclave when carbon dioxide was impregnated as a blowing agent was changed from 4.0 MPa (G) to 2.5 MPa (G). The results are shown in Table 3.

TABLE 2

|  |  |  | Example 1 | Example 2 | Example 3 | Example 4 | Example 5 | Example 6 | Example 7 | Example 8 |
|---|---|---|---|---|---|---|---|---|---|---|
| Base polymer | TPO | kind | TPO1 | TPO1 | TPO1 | TPO1 | TPO1 | TPO1 | TPO1 | TPO2 |
|  | Blending amount | mass % | 80 | 80 | 80 | 80 | 80 | 95 | 80 | 80 |
|  | PE | kind | HDPE1 | HDPE1 | HDPE1 | HDPE1 | HDPE2 | HDPE1 | LLDPE | HDPE1 |
|  | Blending amount | mass % | 20 | 20 | 20 | 20 | 20 | 5 | 20 | 20 |
|  | Type D durometer hardness | — | 30 | 30 | 30 | 30 | 32 | 25 | 28 | 28 |
| Expanded bead | Average particle diameter (D) | mm | 3.8 | 3.5 | 3.5 | 4.3 | 3.2 | 3.2 | 3.2 | 3.4 |
|  | Average mass (W) | mg | 2.0 | 2.0 | 3.0 | 5.0 | 2.0 | 2.0 | 2.0 | 2.0 |
|  | D × W | — | 7.6 | 7.0 | 10.5 | 21.5 | 6.4 | 6.4 | 6.4 | 6.8 |
|  | Heat of fusion | J/g | 71 | 71 | 71 | 71 | 77 | 71 | 65 | 68 |
|  | Melting point (Tm) | ° C. | 125 | 125 | 125 | 125 | 126 | 123 | 121 | 125 |
|  | Crystallization temperature (Tc) | ° C. | 112 | 112 | 112 | 112 | 113 | 106 | 107 | 112 |
|  | Difference [Tm − Tc] | ° C. | 13 | 13 | 13 | 13 | 13 | 17 | 14 | 13 |
|  | Impregnation temperature | ° C. | 110 | 110 | 110 | 110 | 110 | 110 | 110 | 110 |
|  | Crosslinking/foaming temperature | ° C. | 160 | 160 | 160 | 160 | 160 | 160 | 160 | 160 |
|  | Vapor pressure | MPa (G) | 4.0 | 3.5 | 2.5 | 2.5 | 2.5 | 2.5 | 2.5 | 3.5 |
|  | Xylene insoluble content | % | 48 | 51 | 46 | 48 | 54 | 53 | 50 | 52 |
|  | Apparent density | kg/m³ | 62 | 71 | 96 | 99 | 101 | 91 | 102 | 82 |
|  | Bulk density | kg/m³ | 38 | 44 | 60 | 62 | 63 | 57 | 64 | 51 |
| Expanded beads molded article (250 * 200 * 20) | Molding pressure | MPa (G) | 0.20 | 0.20 | 0.20 | 0.20 | 0.20 | 0.20 | 0.20 | 0.20 |
|  | Cracking amount | % | 20 | 20 | 20 | 20 | 20 | 20 | 20 | 20 |
|  | fusion bondability | — | A | A | A | A | A | A | A | A |
|  | Surface properties (secondary foam ability) | — | A | A | A | A | A | A | A | A |
|  | Recoverability | — | A | A | A | A | A | A | A | A |
|  | Moldability | — | A | A | A | A | A | A | A | A |
|  | Number of expanded beads on surface | particles/cm² | 6.5 | 8.6 | 8.3 | 6.2 | 9.8 | 9.6 | 10.3 | 8.4 |
|  | Apparent density | kg/m³ | 40 | 48 | 63 | 70 | 77 | 83 | 86 | 57 |
|  | Type C durometer hardness | — | 19 | 22 | 32 | 33 | 35 | 28 | 33 | 24 |
|  | Shrinkage rate | % | 7.5 | 5.0 | 4.0 | 3.8 | 4.3 | 6.3 | 6.5 | 5.0 |
|  | Tensile strength (A) | MPa | 0.40 | 0.44 | 0.53 | 0.53 | 0.64 | 0.53 | 0.65 | 0.44 |
|  | Tensile elongation (B) | % | 140 | 155 | 193 | 200 | 210 | 205 | 202 | 195 |
|  | A × B | — | 56 | 68 | 102 | 106 | 134 | 109 | 131 | 86 |
|  | B/Apparent density | — | 3.5 | 3.2 | 3.1 | 2.9 | 2.7 | 2.5 | 2.3 | 3.4 |

TABLE 3

| | | | Comparative Example 1 | Comparative Example 2 | Comparative Example 3 | Comparative Example 4 | Comparative Example 5 |
|---|---|---|---|---|---|---|---|
| Base polymer | TPO | kind | TPO1 | TPO1 | TPO1 | TPO1 | TPO1 |
| | Blending amount | mass % | 100 | 100 | 80 | 70 | 50 |
| | PE | kind | — | — | HDPE1 | HDPE1 | HDPE1 |
| | Blending amount | mass % | — | — | 20 | 30 | 50 |
| | Type D durometer hardness | — | 23 | 23 | 30 | 36 | 46 |
| Expanded bead | Average particle diameter (D) | mm | 3.4 | 3.1 | 5.7 | 3.2 | 3.3 |
| | Average mass (W) | mg | 2.0 | 3.0 | 8.0 | 2.0 | 2.0 |
| | D × W | — | 6.8 | 9.3 | 45.6 | 6.4 | 6.6 |
| | Heat of fusion | J/g | 58 | 58 | 71 | 89 | 120 |
| | Melting point (Tm) | ° C. | 121 | 121 | 125 | 127 | 127 |
| | Crystallization temperature (Tc) | ° C. | 100 | 100 | 112 | 115 | 115 |
| | Difference [Tm − Tc] | ° C. | 21 | 21 | 13 | 12 | 12 |
| | Impregnation temperature | ° C. | 110 | 110 | 110 | 110 | 110 |
| | Crosslinking/foaming temperature | ° C. | 160 | 160 | 160 | 160 | 160 |
| | Vapor pressure | MPa (G) | 3.5 | 2.5 | 3.0 | 2.5 | 2.5 |
| | Xylene insoluble content | % | 49 | 52 | 51 | 46 | 46 |
| | Apparent density | kg/m$^3$ | 85 | 118 | 80 | 91 | 86 |
| | Bulk density | kg/m$^3$ | 53 | 74 | 50 | 57 | 54 |
| Expanded beads molded article (250 * 200 * 20) | Molding pressure | MPa (G) | 0.20 | 0.20 | 0.20 | 0.20 | 0.20 |
| | Cracking amount | % | 20 | 20 | 20 | 20 | 20 |
| | fusion bondability | — | A | A | A | A | A |
| | Surface properties (secondary foamability) | — | A | A | A | A | A |
| | Recoverability | — | A | A | A | A | A |
| | Moldability | — | A | A | A | A | A |
| | Number of expanded beads on surface | particles/cm$^2$ | 8.7 | 10.6 | 3.5 | 9.9 | 9.2 |
| | Apparent density | kg/m$^3$ | 62 | 92 | 56 | 61 | 61 |
| | Type C durometer hardness | — | 10 | 29 | 28 | 34 | 42 |
| | Shrinkage rate | % | 7.5 | 6.5 | 3.8 | 3.5 | 2.8 |
| | Tensile strength (A) | MPa | 0.47 | 0.50 | 0.35 | 0.55 | 0.64 |
| | Tensile elongation (B) | % | 203 | 195 | 115 | 134 | 98 |
| | A × B | — | 95 | 98 | 40 | 74 | 63 |
| | B/Apparent density | — | 3.3 | 2.1 | 2.1 | 2.2 | 1.6 |

<Cracking Amount (Compression Ratio) Range in which Molding is Possible>

Expanded beads molded articles were prepared in the same manner as described above, and measurements and evaluations were performed in the same manner as described above, except that a mold (length 250 mm, width 200 mm, thickness 20 mm) was used as the mold, and the cracking amount was adjusted to 5% (1 mm), 10% (2 mm), 20% (4 mm), 30% (6 mm), and 40% (8 mm). The numerical value (mm) described together with the cracking amount (%) is the movement distance of the male mold in the female mold when the expanded bead is filled in the mold cavity and then mold is then closed. The results are shown in Tables 4 and 5. The molding pressure was 0.20 MPa (G) for all the cracking amounts.

TABLE 4

| | | | Example 1 | Example 2 | Example 3 | Example 4 | Example 5 | Example 6 | Example 7 | Example 8 |
|---|---|---|---|---|---|---|---|---|---|---|
| 5% (1 mm) | Fusion bondability | — | A | A | A | NT*[2] | A | A | A | A |
| | Surface properties (secondary foamability) | — | A | A | A | | A | A | A | A |
| | Recoverability | — | A | A | A | | A | B | B | A |
| | Moldability | — | A | A | A | | A | B | B | A |
| 10% (2 mm) | Fusion bondability | — | A | A | A | A | A | A | A | A |
| | Surface properties (secondary foamability) | — | A | A | A | A | A | A | A | A |
| | Recoverability | — | A | A | A | A | A | A | A | A |
| | Moldability | — | A | A | A | A | A | A | A | A |
| 20% (4 mm) | Fusion bondability | — | A | A | A | A | A | A | A | A |
| | Surface properties (secondary foamability) | — | A | A | A | A | A | A | A | A |
| | Recoverability | — | A | A | A | A | A | A | A | A |
| | Moldability | — | A | A | A | A | A | A | A | A |
| 30% (6 mm) | Fusion bondability | — | A | A | A | A | A | A | A | A |
| | Surface properties (secondary foamability) | — | A | A | A | A | A | A | A | A |
| | Recoverability | — | A | A | A | A | A | A | A | A |
| | Moldability | — | A | A | A | A | A | A | A | A |

TABLE 4-continued

| | | | Example 1 | Example 2 | Example 3 | Example 4 | Example 5 | Example 6 | Example 7 | Example 8 |
|---|---|---|---|---|---|---|---|---|---|---|
| 40% | Fusion bondability | — | A | A | A | A | A | A | A | A |
| (8 mm) | Surface properties (secondary foamability) | — | A | A | A | A | A | A | A | A |
| | Recoverability | | — | A | A | A | A | A | A | A | A |
| | Moldability | | — | A | A | A | A | A | A | A | A |
| Cracking amount (compression ratio) range in which molding is possible | | % | 5~40 | 5~40 | 5~40 | 10~40 | 5~40 | 10~40 | 10~40 | 5~40 |

NT*¹: Evaluation not possible due to substantial shrinkage.
NT*²Molded article could not be obtained due to defective filling.

TABLE 5

| | | | Comparative Example 1 | Comparative Example 2 | Comparative Example 3 | Comparative Example 4 | Comparative Example 5 |
|---|---|---|---|---|---|---|---|
| 5% | Fusion bondability | — | NT*¹ | NT*¹ | NT*² | A | A |
| (1 mm) | Surface properties (secondary foamability) | — | | | | A | A |
| | Recoverability | — | | | | A | A |
| | Moldability | — | | | | A | A |
| 10% | Fusion bondability | — | A | A | B | A | A |
| (2 mm) | Surface properties (secondary foamability) | — | A | A | A | A | A |
| | Recoverability | — | B | B | A | A | A |
| | Moldability | — | B | B | B | A | A |
| 20% | Fusion bondability | — | A | A | A | A | A |
| (4 mm) | Surface properties (secondary foamability) | — | A | A | A | A | A |
| | Recoverability | — | A | A | A | A | A |
| | Moldability | — | A | A | A | A | A |
| 30% | Fusion bondability | — | A | A | A | B | B |
| (6 mm) | Surface properties (secondary foamability) | — | A | A | A | A | A |
| | Recoverability | — | A | A | A | A | A |
| | Moldability | — | A | A | A | B | B |
| 40% | Fusion bondability | — | A | A | A | NT | NT |
| (8 mm) | Surface properties (secondary foamability) | — | A | A | A | | |
| | Recoverability | — | A | A | A | | |
| | Moldability | — | A | A | A | | |
| Cracking amount (compression ratio) range in which molding is possible | | % | 20~40 | 20~40 | 20~40 | 5~20 | 5~20 |

NT*¹Evaluation not possible due to substantial shrinkage.
NT*²Molded article could not be obtained due to defective filling.

As can be seen from Table 4, the expanded bead of the present invention has a wide cracking amount range in which molding is possible at a constant forming pressure. Therefore, the expanded bead of the present invention is an expanded bead having even better moldability for a molded article prepared by using a mold having a thickness difference. Further, as can be seen from Table 2, the obtained expanded beads molded article had a product [A×B] of 15 or more, and showed excellent durability while exhibiting the flexibility owing to the TPO. Therefore, according to the present invention, it is possible to mold a molded article having excellent moldability and durability even when the shape is more complicated.

The difference [Tm−Tc] of the expanded bead of Comparative Example 1 and Comparative Example 2 is too high, and therefore sink marks occurred under molding conditions where the cracking amount was low, and the cracking amount range in which molding of a good molded article is possible was narrow.

The average particle diameter of the expanded bead of Comparative Example 3 was too large, and therefore the fillability of the expanded bead was poor, and the cracking amount range in which molding of a good molded article is possible was narrow. Moreover, the durability of the obtained molded article was poor.

The heat of fusion of the expanded bead of Comparative Example 4 and Comparative Example 5 was too large, and therefore the fusion bondability when the molded particle was molded by increasing the cracking amount was insufficient, and the cracking amount range in which molding of a good molded article is possible was narrow.

The expanded bead of the present invention can mold a molded article having a large thickness difference and a complicated shape, and therefore holds promise for applications in fields such as sporting goods, automobile parts, and building materials.

The invention claimed is:

1. A thermoplastic olefinic elastomer expanded bead, which is an expanded bead comprising a thermoplastic olefinic elastomer as a main component, wherein the expanded bead has an average particle diameter of 0.5 to 5 mm, the expanded bead has a heat of fusion of 60 to 80 J/ g, a difference [Tm–Tc] between a melting point (Tm) and a crystallization temperature (Tc) of the expanded bead is 20° C. or lower, the expanded bead has a crystallization temperature (Tc) of 105 to 120° C., and the expanded bead has a base polymer composed of a mixture of the thermoplastic olefinic elastomer and a polyethylene-based resin, and a content of the polyethylene-based resin in the base polymer is 3 to 25% by mass.

2. The thermoplastic olefinic elastomer expanded bead according to claim 1, wherein the thermoplastic olefinic elastomer is a block copolymer of a hard segment composed of a polyethylene block and a soft segment composed of an ethylene/α-olefin copolymer block.

3. The thermoplastic olefinic elastomer expanded bead according to claim 1, wherein the polyethylene-based resin is high-density polyethylene.

4. The thermoplastic olefinic elastomer expanded bead according to claim 1, wherein the expanded bead has an average particle diameter (D) of 1 to 4 mm and the expanded bead has an average mass (W) of 1 to 4 mg.

5. The thermoplastic olefinic elastomer expanded bead according to claim 1, wherein a product [(D)×(W)] of the average particle diameter (D) and the average mass (W) of the expanded bead is 15 or less.

6. The thermoplastic olefinic elastomer expanded bead according to claim 1, wherein the expanded bead has an average particle diameter (D) of 1 to 4 mm, the expanded bead has an average mass (W) of 1 to 4 mg, and a product [(D)×(W)] of the average particle diameter (D) and the average mass (W) of the expanded bead is 15 or less.

7. The thermoplastic olefinic elastomer expanded bead according to claim 1, wherein the expanded bead has a xylene insoluble content obtained by thermal xylene extraction of 30 to 70% by mass.

8. The thermoplastic olefinic elastomer expanded bead according to claim 1, wherein the expanded bead has an apparent density of 30 to 150 kg/m³.

9. A thermoplastic olefinic elastomer expanded beads molded article, which is an expanded beads molded article constituted from an expanded bead comprising a thermoplastic olefinic elastomer as a main component, wherein the expanded bead has a heat of fusion of 60 to 80 J/g, a difference [Tm–Tc] between a melting point (Tm) and a crystallization temperature (Tc) of the expanded bead is 20° C. or lower, the number of expanded beads per unit area on a surface of the expanded beads molded article is 3 to 30 particles/cm², the expanded bead has a crystallization temperature (Tc) of 105 to 120° C., and the expanded bead has a base polymer composed of a mixture of the thermoplastic olefinic elastomer and a polyethylene-based resin, and a content of the polyethylene-based resin in the base polymer is 3 to 25% by mass.

10. The thermoplastic olefinic elastomer expanded beads molded article according to claim 9, wherein the expanded beads molded article satisfies the following relationship (Expression 1):

$$15 \leq A \times B \qquad \text{(Expression 1)}$$

wherein A represents a tensile strength (MPa) of the expanded beads molded article, and B represents a tensile elongation (%) of the expanded beads molded article.

11. A thermoplastic olefinic elastomer expanded beads molded article, which is an expanded beads molded article constituted from an expanded bead comprising a thermoplastic olefinic elastomer as a main component, wherein the expanded bead has a heat of fusion of 60 to 80 J/g, a difference [Tm–Tc] between a melting point (Tm) and a crystallization temperature (Tc) of the expanded bead is 20° C. or lower, the number of expanded beads per unit area on a surface of the expanded beads molded article is 6.5 to 30 particles/cm², and the expanded beads molded article satisfies the following relationship (Expression 2):

$$45 \leq A \times B \leq 135 \qquad \text{(Expression 2)}$$

wherein A represents a tensile strength (MPa) of the expanded beads molded article, and B represents a tensile elongation (%) of the expanded beads molded article, the expanded bead has a base polymer composed of a mixture of the thermoplastic olefinic elastomer and a polyethylene-based resin, and a content of the polyethylene-based resin in the base polymer is 3 to 25% by mass.

\* \* \* \* \*